(No Model.)
J. L. TATRO.
BICYCLE.
No. 602,609. Patented Apr. 19, 1898.
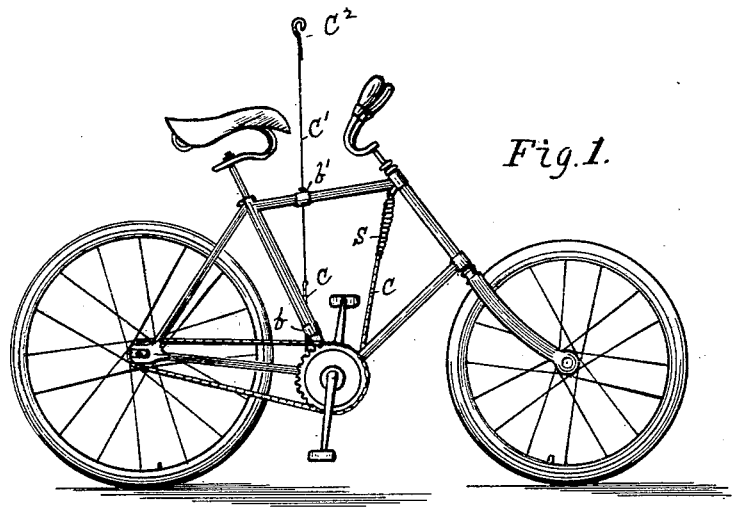
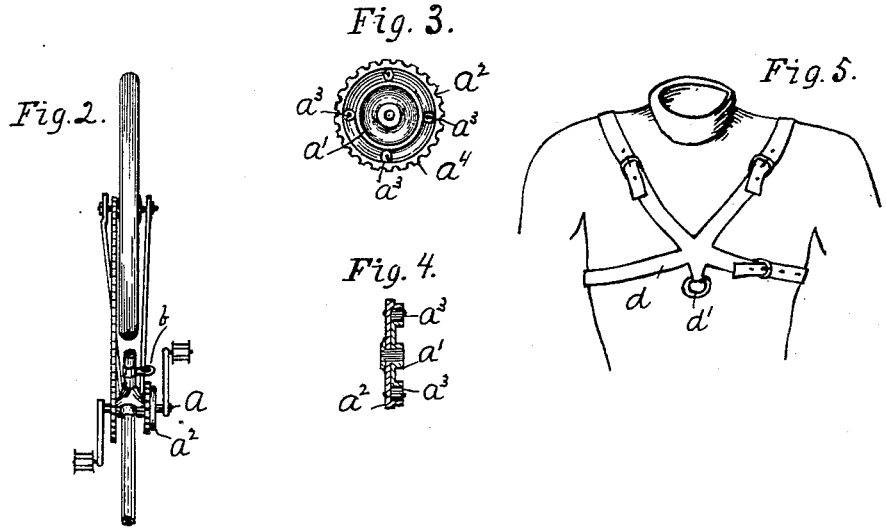
Witnesses
C. O. Mason
S. E. Bain
Inventor
Joseph L. Tatro
by H. M. Mason
Atty.

UNITED STATES PATENT OFFICE.

JOSEPH L. TATRO, OF NEW BEDFORD, MASSACHUSETTS.

BICYCLE.

SPECIFICATION forming part of Letters Patent No. 602,609, dated April 19, 1898.

Application filed January 20, 1897. Serial No. 619,917. (No model.)

*To all whom it may concern:*

Be it known that I, JOSEPH L. TATRO, a citizen of the United States, residing at New Bedford, in the county of Bristol and State of Massachusetts, have invented certain new and useful Improvements in Bicycles, of which the following is a specification.

The object of my invention is to provide additional means for propelling the bicycle; and to this end my invention consists in providing the pedal-shaft with an additional sprocket wheel and clutch and in arranging a chain for revolving said sprocket and clutch, adapted to be operated by the motion of the upper portion of the trunk and shoulders of the rider.

The accompanying drawings illustrate my invention, in which—

Figure 1 is a side elevation of a bicycle provided with my improvements. Fig. 2 is a top view of the same with the upper portion of the frame and the front wheel cut away. Fig. 3 is an enlarged side view of the additional sprocket and clutch. Fig. 4 is a view in cross-section of the same. Fig. 5 is a view showing the arrangement for operating the chain for revolving the sprocket and clutch.

Similar letters refer to like parts in the several views.

The letter $a$ indicates the pedal-shaft of the bicycle, which projects beyond its bearing on the side opposite to the ordinary sprocket mounted thereon and is provided with the sprocket-clutch $a^2$, which consists of the wheel $a'$, rigidly secured to the pedal-shaft $a$ and covered by the recessed sprocket $a^4$, loosely mounted on the shaft and provided with the clutches $a^3$, pivoted thereto. The clutches $a^3$ are arranged in such a manner that when the sprocket $a^4$ is revolved in a forward direction they bind or clutch the wheel $a^2$ and cause it to revolve and also the pedal-shaft, to which it is secured; but when the sprocket $a^4$ is motionless the wheel $a'$ is free to revolve with the pedal-shaft.

$s$ indicates a coiled spring secured at one end to the frame of the bicycle and having a sprocket-chain $c$ secured to its opposite end and adapted to engage with the sprocket $a^4$. A cord or wire $c'$ is secured to the opposite end of the chain $c$ and provided with a hook $c^2$. The rider wears a strap or harness $d$ around his shoulders, as shown in Fig. 5, which is provided with a ring $d'$, adapted to engage with the hook $c^2$. A guide $b$ for guiding the chain $c$ on the sprocket $a^4$ may be provided on the frame of the bicycle; also, a guide or support $b'$ for the wire or cord $c'$.

The operation of the device is as follows: The rider, having the harness $d$ secured about his shoulders, takes his seat on the bicycle in the usual manner and, leaning forward, engages the hook $c^2$ with the ring $d'$, and as he pedals with his feet he bends his body backward and forward, thus causing the chain $c$ to revolve the sprocket-clutch $a^2$ and thereby propel the bicycle in a forward direction.

As the rider bends his body backward to exert a force on the chain $c$ to propel the bicycle he is enabled to exert a greater force with his foot on the descending pedal, and thus increased speed is obtained.

Having thus described my invention, what I claim, and desire to secure by Letters Patent, is—

The combination in a bicycle, of a clutch mounted upon the pedal-shaft, said clutch comprising a wheel rigidly mounted on the said pedal-shaft and the sprocket having the clutches attached thereto, a chain passing around the said sprocket having one of its ends attached to a spring which is attached to the steering-head, the other end being secured to a cord or wire which is provided with a hook adapted to be fastened to suitable harness upon the rider's back.

JOSEPH L. TATRO.

Witnesses:
JAMES TATRO,
FRANK BOURGEOIS.